Figure 2:
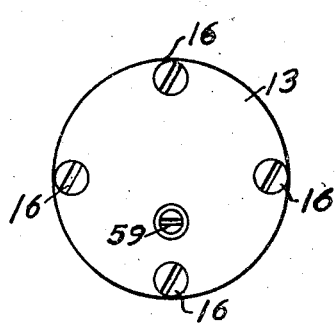

July 15, 1947.  J. W. K. JURRAT  2,423,980

LATCHING DEVICE

Filed May 22, 1945  2 Sheets-Sheet 1

INVENTOR.
John W. K. Jurrat
BY
Earl E. Moore

July 15, 1947. J. W. K. JURRAT 2,423,980
LATCHING DEVICE
Filed May 22, 1945 2 Sheets-Sheet 2

INVENTOR.
John W. K. Jurrat
BY
Earl E. Moore
ATTY.

Patented July 15, 1947

2,423,980

UNITED STATES PATENT OFFICE 2,423,980

LATCHING DEVICE

John W. K. Jurrat, Glendale, Calif.

Application May 22, 1945, Serial No. 595,176

8 Claims. (Cl. 292—37)

This invention is for a new and novel hold means or latching and locking means having an operative element for unlatching and/or unlocking the means; the same being an improvement over similar means now being employed for fastening panels, doors, windows, drawers, and other objects whether or not in combination with floors, walls, ceilings, and other places where such an invention as this may be useful.

The invention employs sliding plates or jaws having means for engaging a recessed portion of a bolt or the like, the plates being resiliently and continuously urged toward each other so as to always be in a position to engage the bolt, key, rod, screwdriver, or lever means are provided for the purpose of operating a spreader element which wedges the locking or latching plates apart with ease, but which plates, however, firmly and securely hold the bolt when the spreader element is not operated.

One of the principal objects of this invention is to present a latching and/or locking device that consists of various simple and cooperating parts that are concealed and protected, which parts are durable, inexpensive, and which serve to make a dependable latch or lock which is economical to make and manufacture.

Another object is to provide an improved latch and/or lock unit which is an effective means for securing things together in a neat and tidy manner, the unit being so constructed and arranged that it can be made very small and can be used where secret latches and/or locks are desired.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

Figures 1, 3:
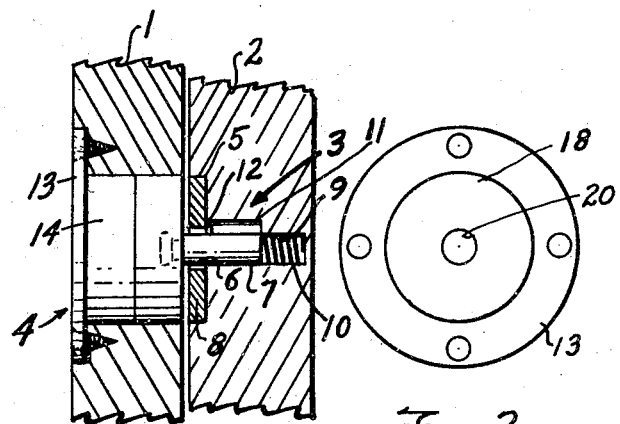
Figure 4A:
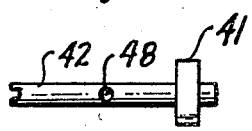
Figure 4B:
Figure 4C:
Figure 4:
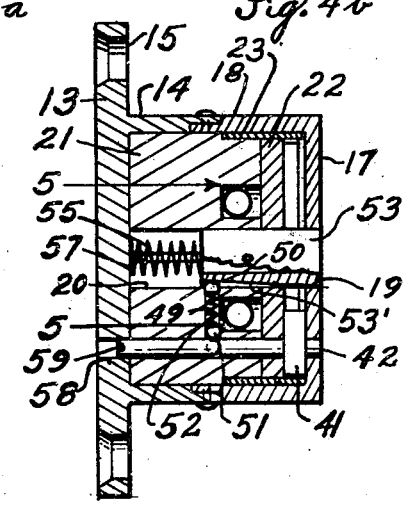
Figure 5:
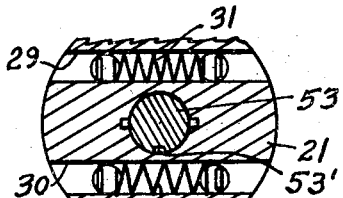
Figure 6:
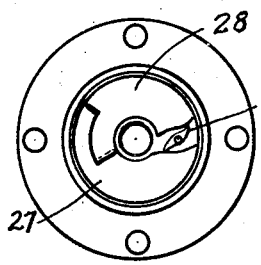

In the drawings:

Fig. 1 shows a portion of a pair of slightly spaced apart slidable panels in cross section with the invention applied thereto and shown in side elevational view, Fig. 2 is a front elevational view of the latching device only as disclosed in Fig. 1, Fig. 3 is a rear elevational view of the latching device only, that is, the device fixed to the front panel, Fig. 4 is an enlarged cross sectional view of the latching device, Fig. 4a is a side elevational view of a key pin used in the invention, and taken from the device shown in Fig. 4, Fig. 4b is a side elevational view of a plunger element, and taken from the device of Fig. 4, Fig. 4c is a side elevational view of a bolt element, and sized to fit the device of Fig. 4, Fig. 5 is a sectional view taken substantially along the line 5—5 of Fig. 4, Fig. 6 is an elevational view of the rear part of the latching device with the rear covering removed, and shown at normal size.

Figure 7:
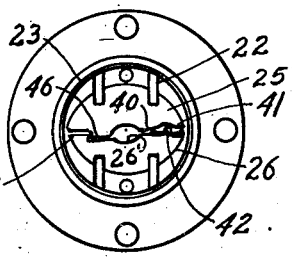
Figure 8:
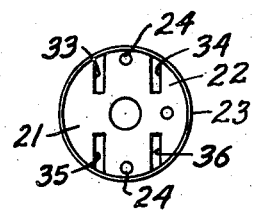
Figure 9:
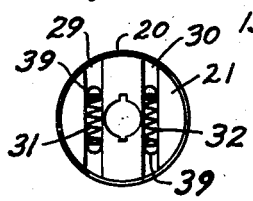
Figure 10:
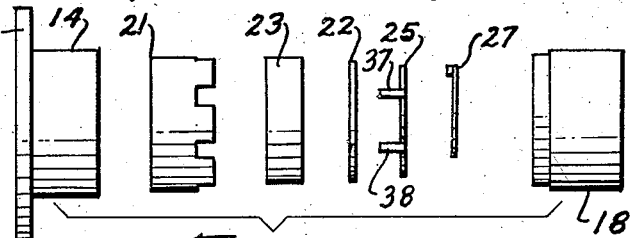
Figure 11:
Figure 12:
Figure 13:
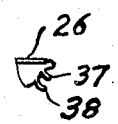
Figure 14:
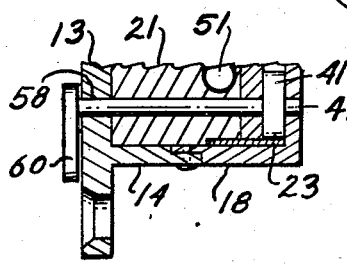

Fig. 7 is a view like that of Fig. 6, but showing a different portion of the working elements, Fig. 8 is an elevational view of a base plate, Fig. 9 is an elevational view of one face of the base block, Fig. 10 is an exploded view of various parts of the invention and shown in side elevational view, the parts being arranged in their proper order for placement within the housing of the latching device, Fig. 11 is a perspective view of a spreader plate element, Fig. 12 is a perspective view of another spreader plate element, Fig. 13 is a perspective view of one of the plate jaws, Fig. 14 is a cross sectional view, enlarged, of the lower portion of the latching device showing a slightly modified form of the invention, The latching device of this invention is shown as applied to the sliding panels 1 and 2, the panels being coordinated so that the keeper portion 3 of the latching means and the latching device can be alined. When the two component parts of the latching means are brought together, the two are secured together, and it makes no difference how the two are brought together in that they may meet by motion in an axial direction or at right angles thereto.

The keeper portion 3 of the invention comprises an exposed frontal plate 5 having a hole 6 therein to permit the bolt 7 to pass or project outwardly therefrom. The frontal plate may be fixed to panel 2 in any suitable manner, as for instance, by the wood screws 8. A bore 9 is provided for movement of the bolt and at the rear end thereof there is a coil type compression spring 10. So that the bolt doesn't escape from its bore, a groove 11 is formed in the wall of the bore for guiding a pin 12 which is integral with or secured to the side of the bolt, the pin being so positioned on the bolt so that when it strikes the frontal plate 5, the bolt is in proper position with respect to the workings of the latching device to be presently explained. The spring 10 should be only strong enough to assure the bolt protruding from its bore. Any suitable bevel means may be provided on the front panel for forcing the bolt into its keeper in the event that the front panel entirely clears the bolt. When the keeper is employed so as not to require any movement thereof, the bolt should then be rigidly fixed in the bore to prevent its movement, but in which event, the clamping end of the bolt protrudes beyond the surface of the panel a sufficient distance to enable the latching device to engage it.

The latching device 4 has a housing consisting of a front plate 13 having the inward projecting integral and annular wall 14, the edge of which is rabbeted as best shown in Fig. 4. Around the periphery of the front plate are a plurality of screw holes 15 adapted to accommodate the wood screws 16 which enter the wooden portion of the panel and securely hold the front portion of the housing thereto. The other part of the housing consists of a disc-like wall or plate 17 having the outward projecting integral annular wall 18, the edge of which is rabbeted to receive the rabbeted portion of the other part of the housing in order to make a complete air tight enclosure for the working parts of the latching device.

The housing wall 17 is provided with a bore 19 which is in alinement with an elongated bore 20 of a base block 21, the block being sized and shaped to snugly fit within the chamber of the front housing part 14. Adjacent the inner face portion of the block, there is a base plate 22 which is in the shape of a disc and sized to snugly fit within a ferrule ring 23, the ring itself being snugly supported upon a rabbeted portion of the base block. The principal function of the ring is to accurately center all the parts within it and to aid their work. The base plate is securely fixed to the block by any suitable means, such as screws which pass through the holes 24 of the plate. Also within the confines of the ring are the pair of plate jaws 25 and 26, and also the pairs of push plates 27 and 28.

The base block 21 is provided with the parallel grooves 29 and 30 which accommodate the coiled tension springs 31 and 32. In alinement with the grooves are the slots 33, 34, 35 and 36 in the base plate which provide passage means for the fingers 37 and 38 which are integral with their respective plate jaws and arranged so that the fingers can connect with the loops 39 of the springs 31 and 32. The springs 31 and 32 keep the plate jaws toward closed position in a manner to be better understood later. At one end of each plate jaw, there is a cutaway portion 40, curved in an offset manner, as shown, to coact with a wedger, or spreader element 41 which is fixed near one end of a turn-pin or spindle 42. When the spindle is turned from the position shown in Fig. 7, the plate jaws 25 and 26 will spread apart, but unless some provision is made, the plate jaws will not spread apart evenly; this is the function of the push plates 27 and 28. Note that the push plate 27 (Fig. 11) has a turned down flange or lip 43 and that the other push plate has a similar flange or lip 44; the lip 43 is designed to engage the edge 45 of plate jaw 26 when properly positioned, and the lip 44 is designed to engage the edge 46 of plate jaw 25 when properly positioned. By the foregoing construction, it can now be seen that when the spreader element 41 is turned to spread apart the plate jaws 25 and 26, that it also spreads the push plates 27 and 28 in the same manner, but the spreading of the push plates forces the other ends of the plate jaws to spread also by the action of the lips 43 and 44 upon the edges 45 and 46 of the plate jaws.

The central portion 26' of the plate jaws are designed to enter the annular recessed portion 47 of the bolt or stud 7. These plates therefore hold onto the bolt until the plate jaws 25—26 are spread apart to free the bolt; or vice versa, as in the case where the latching device 4 is the moving part and the keeper 3 is the fixed part. The edges of the plate jaws 25—26 around the spreader riding portion thereof is so shaped and curved that they will force the spreader element 41 to return to its inoperative position, as shown in Fig. 7, when the spindle 42 is released by the person operating it, but to prevent this action from being too free and to have some regulation thereof, a hemi-spherical cavity 48 is provided on the side of the spindle which is at right angles to the longitudinal axis of the spreader 41 (see Fig. 4). In alinement with the cavity there is a bore 49 in which are the two free rolling balls 50 and 51 with the compression spring 52 between them, the action of which will presently be apparent.

In the large bore 20 of the base block and base plate, there is a plunger or stop element 53 having a cavity 54 that accommodates one end of a coiled compression spring 55, the other end of this spring contacting the inner surface of the front housing plate 13. To prevent the plunger from leaving its bore, it is provided with extending pins 56 that ride in the side grooves 57 of the base block. The plunger is formed with an inclined strip 53' to provide a slanted surface or track for the ball 50 to ride along. By this construction, the strength of the spring 52 is diminished when the plunger is positioned as shown in Fig. 4 so that the ball 51 can easily ride into and out of the cavity 48.

The spindle 42 is journalled in the base plate 22 and the wall 17, as shown, and the distal end thereof is shown as a little short of the outer edge of the bore 58 and provided with a groove 59 which can be operated by a screwdriver, or a key so shaped at its end, not shown.

When the spindle is turned into the position shown in Fig. 4, the plate jaws are separated and held so by the plunger 53 which is maintained in such position by the strong spring 55. When the end 7' of the bolt is forced into the bore 20, the plunger 53 is compressed into the bore, and the small spring 52, between the balls 50 and 51, is also compressed so as to positively force the ball 51 into the cavity 48 of the stem when the cavity is in register with the bore 49.

When the spreader 41 is in the position shown in Fig. 6, the cavity 48 is in register with the bore 49, and the ball 51 will remain in the cavity when the plunger 53 is down in its bore, but when the stud or bolt 7 is released from the plate jaws, the plunger will spring to the top of the bore (as in Fig. 4) and release the pressure on ball 51 so that it will then readily leave the cavity, thus the cam-like curvature of the spreader and the plate jaws (also push plates) will, because of the springs 31 and 32, force the spreader and its stem to rotate so as to let the jaws and plates close and be ready to again engage the bolt 7.

The slightly modified form of the invention shown in Fig. 14 has all the same parts as the first described form except that the spindle 42 is extended through the bore a sufficient distance to receive the lever 60 which is securely fixed thereto as by a set screw or any other means. This construction allows an operator to turn the spindle 42 by merely swinging the lever 60 to one side.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a latching device having a protective casing with means extending therefrom for connection to the thing to be latched, a base block with a bore therethrough in the casing having one face thereof provided with a pair of grooves, a spring in each groove, a base plate coincident with the block surface having the grooves and superimposed thereon, a plurality of slots in the plate having coincidence with the grooves of the block, a pair of plate-like jaws coincident with the base plate and having fingers extending therefrom and extending through the slots and engaging said springs in a manner that the springs urge the jaws together, a central opening spot between the jaws presenting lips adapted to enter the bore of the block and make contact with a stud to latch it.

2. In a holding device adapted to engage a stud, a casing having a chamber therein which is provided with a base block, a base plate, plate-like jaw means and jaw spreaders all arranged in the order named and superimposed one upon the other, a bore through the block and the plate adapted to receive a removable stud, an open spot at the central portion of the jaw means and the spreaders in alinement with the bore, resilient means for urging the jaw means into stud grasping position, and control means for forcing the jaw means to part and for moving the spreaders to force the distal ends of the jaw means apart.

3. The holding device recited in claim 2 wherein the bore is provided with a plunger, a spring for moving the plunger through the bore and the recited open spots, the control means including a stem with means at one end for turning it, ball engaging means on the stem, a cross bore extending through the block from the stem to the bore, a pair of balls in the cross bore having a compression spring between them which is compressed when the plunger is down in the bore of the block.

4. The holding device recited in claim 2 wherein the jaw spreaders comprise a pair of plates having arms extending toward each other, and each arm is provided with a depending lip.

5. The holding device recited in claim 2 wherein the jaw means comprise a pair of similar plates having depending fingers.

6. In a latching device, a casing having a chamber therein which is provided with a snugly fitting base block having a base plate coincident with one surface thereof, a plate-like jaw means adapted to slide on a surface of the base plate on the side opposite to the side facing the base block, and jaw spreader plates on the outer side of the jaw means, all the aforementioned parts being arranged in the order named and having their adjacent faces in contact with one another, a bore through the block and plate adapted to receive a latching stud, said jaw means having opposed edges with the central portions thereof curved, a curved cam-like surface at the ends of the opposing edges of the jaw means, a spreader element journalled between the curved cam-like edges of the jaw means and which is adapted to be rotated for spreading the jaw means, but the spreader element being rotated by pressure of the jaw means when the bore is clear of a latching stud.

7. In a latching device, a casing having a chamber with a base block therein, a base plate on one side of and coincident with one surface of the block, plate-like jaw means adapted to slide on one surface of the base plate, spreader plates adapted to slide on one side of the jaw means, all of said parts being positioned in the order named; a bore through the block and plate adapted to receive a latching stud, the jaw means and the spreader plates each including a pair of elements having opposed edges with the central portions configurated to allow a latching stud to enter, a spreader element at one end of the jaw means and the spreader plates shaped to force the jaw means and the spreader plates apart when rotated and to allow the jaw means and the spreader plates to rotate it when they are forced against it.

8. The device recited in claim 7 wherein a plunger is provided in the bore having one side thereof provided with an inclined track, a strong spring urging the plunger toward the spreader plates, a cross bore having a spring between a pair of free rolling balls, a cavity in a portion of the spreader element which can be registered with the cross bore when the spreader element is rotated for the purpose described.

JOHN W. K. JURRAT.

REFERENCES CITED

The following references are of record in the file of this patent:

UNITED STATES PATENTS

| Number | Name | Date |
| --- | --- | --- |
| 170,575 | Logan | Nov. 30, 1875 |
| 1,764,367 | Syzmanski | June 17, 1930 |